United States Patent [19]

Gajdos

[11] 4,039,149

[45] Aug. 2, 1977

[54] LUMP BREAKER APPARATUS FOR REACTOR TANK

[75] Inventor: Leslie Bill Gajdos, Lakewood, Ohio

[73] Assignee: The B. F. Goodrich Company, Akron, Ohio

[21] Appl. No.: 694,329

[22] Filed: June 9, 1976

[51] Int. Cl.² .......................................... B02C 23/36
[52] U.S. Cl. .......................................... 241/46.11
[58] Field of Search ............. 241/43, 44, 46 R, 46.11, 241/46.17, 138, 146, 154, 163

[56] References Cited

U.S. PATENT DOCUMENTS

| | | | |
|---|---|---|---|
| 2,578,274 | 12/1951 | Weigham et al. | 241/46.11 |
| 2,798,698 | 7/1957 | Dooley | 241/46.17 |
| 3,877,648 | 4/1975 | Vokes | 241/46.17 |
| 3,976,252 | 8/1976 | Perdue | 241/46.11 |

*Primary Examiner*—Granville Y. Custer, Jr.
*Attorney, Agent, or Firm*—Joseph Januszkiewicz; W. A. Shira, Jr.

[57] ABSTRACT

A lump breaker apparatus having a chamber with a plurality of alternating rotor and stator members cooperative with each other to uniformly break lumps from a reactor tank eliminating back pressure in the system. The stator members axially slidable are retained in position by the housing.

17 Claims, 7 Drawing Figures

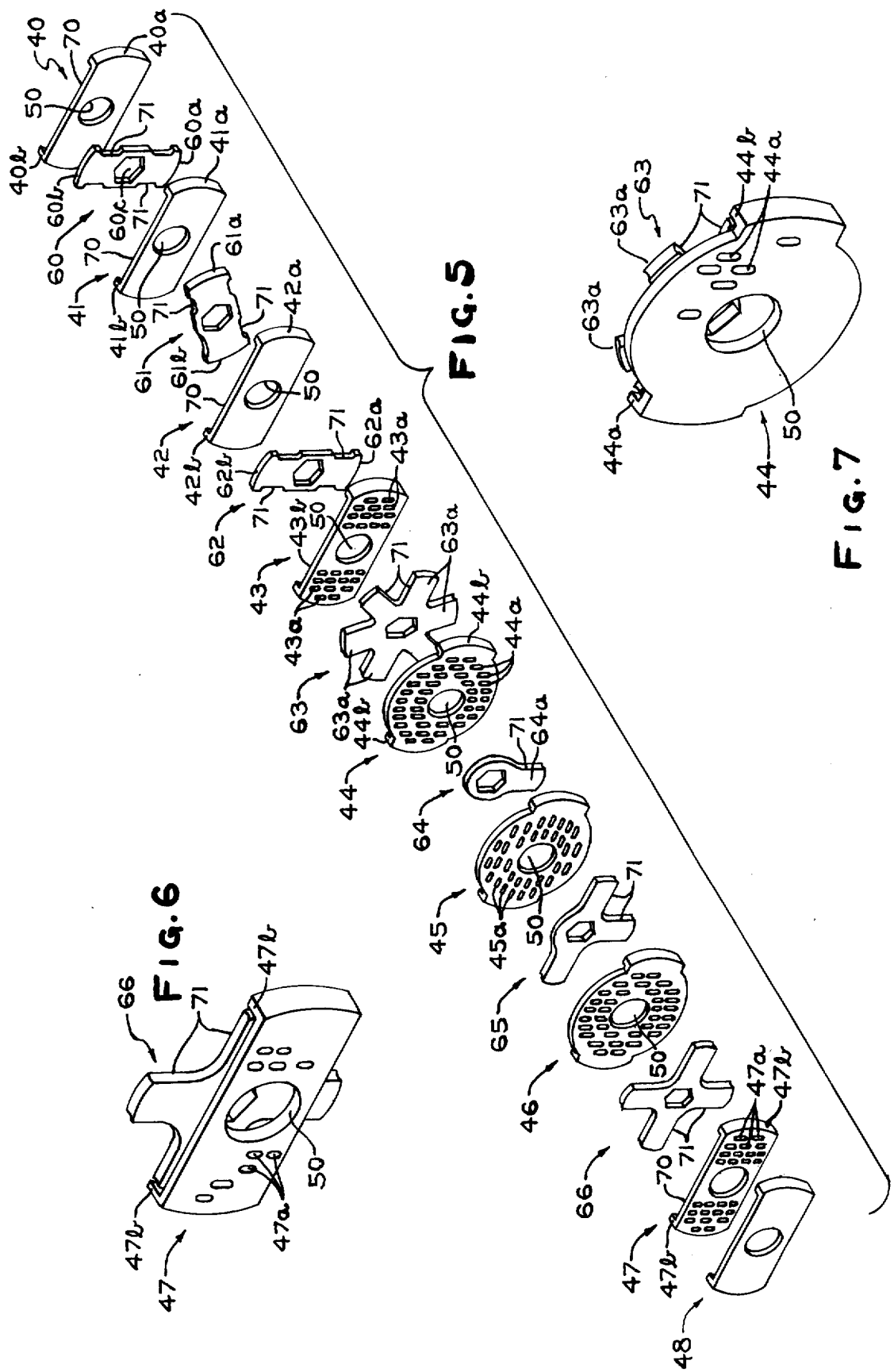

LUMP BREAKER APPARATUS FOR REACTOR TANK

BACKGROUND OF THE INVENTION

This invention relates to a three stage breaker apparatus wherein the apparatus breaks the large particles that are in the slurry from a reactor tank into predetermined particle size to assure that the slurry will pass through the system without clogging it.

Large reactor tanks are used to polymerize vinyl chloride into polyvinyl chloride (PVC) after which the PVC slurry is pumped via suitable pipes for further processing. The reactor tanks have strainer baskets located at the outlet opening for collecting oversized build-up particles or chunks. During the polymerization process certain amounts of PVC build-up occurs on the walls, baffles and agitators of the reactor tanks. Such build-up in the form of lumps is caught by the strainer basket which is then emptied daily, presenting a safety hazard of vinyl chloride gas exposure. Without the use of the strainer baskets, the lumps in the slurry would cause partial clogging or plugging of the lines in the system and eventually would require a close down or interruption in the PVC production. The present invention provides a lump breaker apparatus that eliminates the use of basket strainer and assures non-interruption in the operation due to the lumps being reduced to predetermined size to assure passage through the whole system. The present apparatus is particularly efficient in its operation and require little maintenance. The apparatus provides means for rapid disassembly of parts, quick removal of the stator and rotor members and their resharpening or replacement with a minimum of down time. Prior art apparatus required the removal of the entire housing from the pipe line system before the rotor blades could be removed. With the apparatus of the present invention, the particle size is reduced by a shearing action to a predetermined size and not pulverized. The apparatus of the present invention requires that the particles pass through several combinations of stator plates with their cooperative rotary shear members such that the particles is hit several times by the rotary shear members before it can pass through the system. The apparatus eliminates back pressure by providing a discharge opening that is greater than the inlet opening wherein there is an initial rough breaking followed by two separate or stage shearing actions which reduce the particle size to an acceptable predetermined size.

SUMMARY OF THE INVENTION

The present invention contemplates the use of a lump breaker apparatus on the discharge pipe of a reactor tank wherein the apparatus has two chambers or compartments that are interconnected, with the primary chamber defining a three stage operation having a plurality of rotor members that alternate with stator members and cooperative therewith to assure the reduction of lump size in the slurry to a predetermined size as it passes to the second chamber or compartment. The rotor and stator shear members mounted adjacent to the inlet opening are reduced in size providing the first stage or the rough lump breaking of the large particle sizes, with the additional rotor members operating in the separate downstream portions of the slurry as it divides into two separate flow paths for further separate reduction in size. In the second and third stage, the stator restrictor shear members have apertures that are cooperative with adjacent rotors to facilitate the reduction in size of the slurry lumps.

BRIEF DESCRIPTION OF THE DRAWINGS

FIG. 5 is an exploded perspective view of one-half of the total number of rotor and stator restrictor shear members in the central chamber of the housing.

FIG. 6 is an isometric view of a stator and rotor member in nestled relationship.

FIG. 7 is an isometric view of a stator and rotor member in nestled relationship.

DETAILED DESCRIPTION

Figure 1:
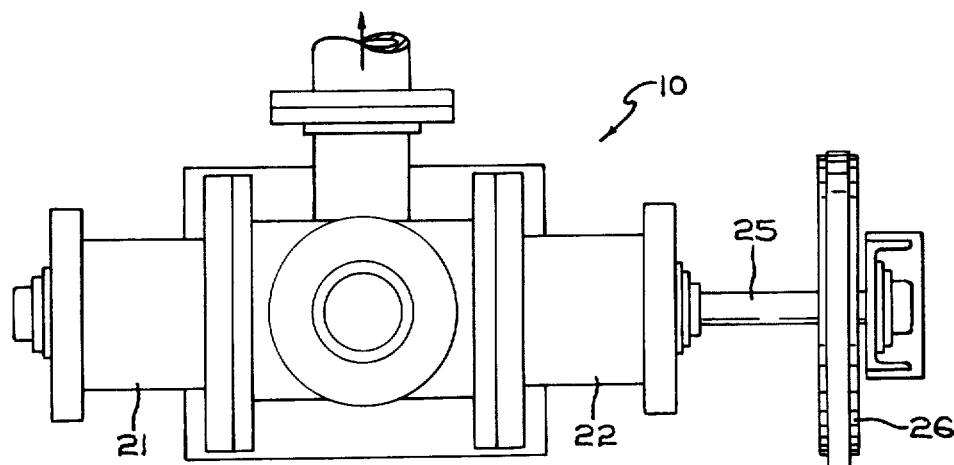
FIG. 1 is a plan view of the lump breaker apparatus of the preferred embodiment of the invention.
Figure 3:
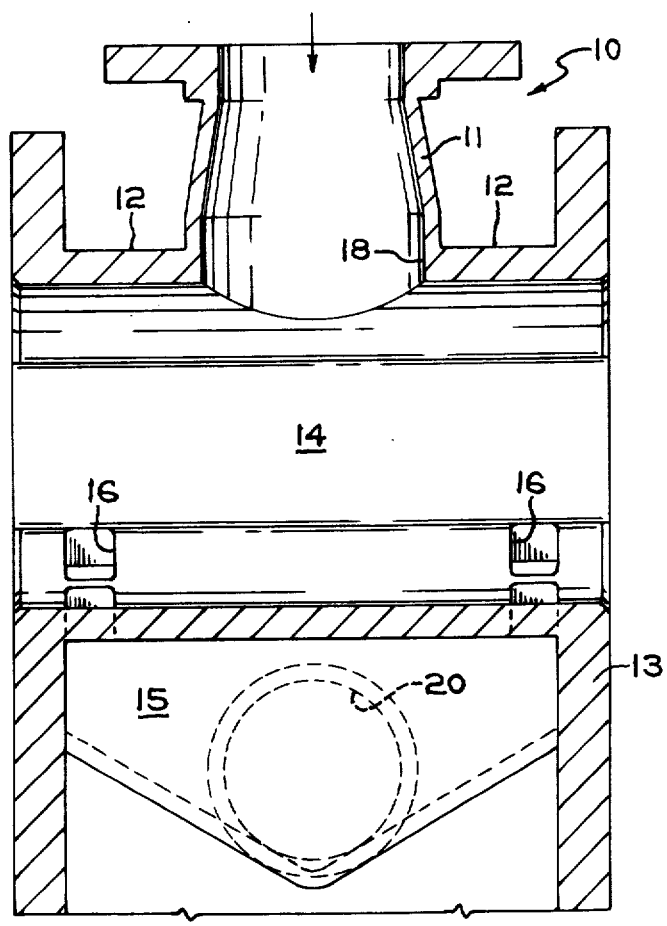
FIG. 3 is a front elevational view in cross section of the housing for the lump breaker apparatus.
Figure 4:
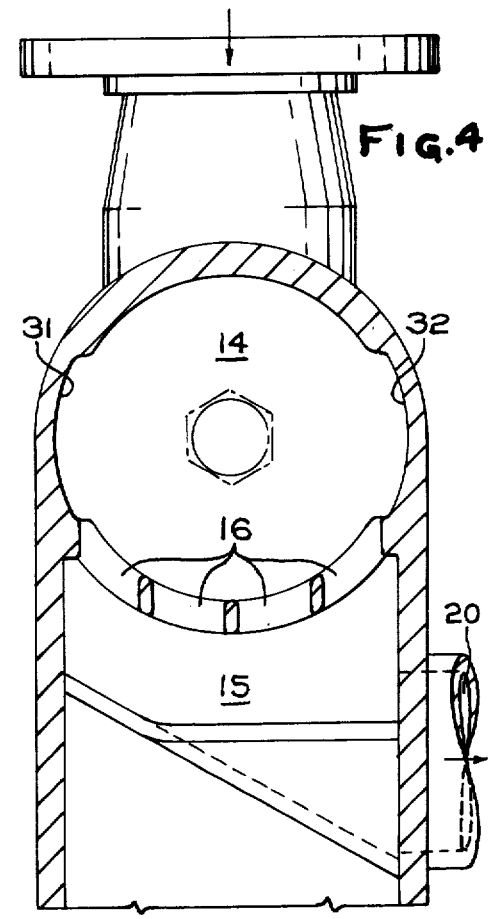
FIG. 4 is a side elevational view of the housing in cross section.
Figure 2:
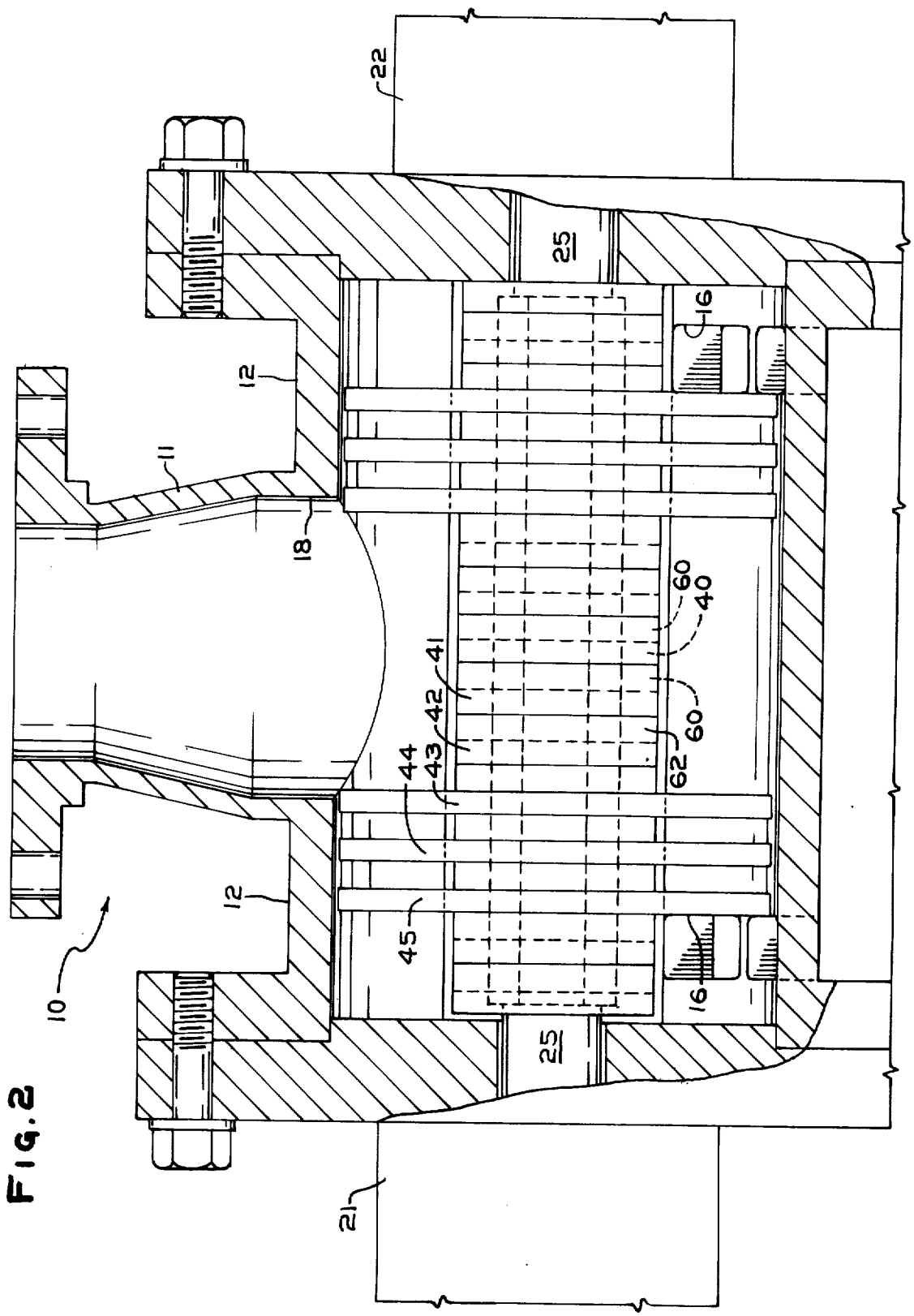
FIG. 2 is a front elevational view of the upper portion of the lump breaker apparatus showing a major portion thereof in cross section.

Referring now to the drawings, wherein like reference characters designate like or corresponding parts throughout the several views, there is shown in FIGS. 1 and 3 a housing 10 having an inlet portion 11 and an upper portion with two end portions 12 and a lower portion 13. The upper portion is generally cylindrical in shape defining a chamber 14 which communicates with the compartment 15 in lower portion 13 via apertures 16 in the respective end portions 12. The inlet portion 11 has an opening 18 which communicates with the central portion of chamber 14. The total surface area of the apertures 16 is greater than the cross-sectional surface area of opening 18. The flanged portion of inlet portion 11 is adapted to be connected to the outlet of a reactor tank for receiving the slurry therefrom. The lower portion 13 of housing 10 has a discharge opening 20 from which the slurry is discharged. The respective end portions 12 of housing 10 have bearing housings 21–22 suitably secured thereto for housing suitable bearings which support the end portions of the central shaft 25 in a manner old and well-known in the art. The one end of shaft 25 suitably supports a pulley 26 about which is trained a belt 27 which is connected to a drive pulley 28 driven by a motor 30. That portion of shaft 25 located in chamber 14 is polygonal in cross section for a purpose to be described. The inner wall surface of the cylindrical portion of chamber 14 has a pair of longitudinally extending recesses as at 31 and 32 (FIG. 4). Located within chamber 14 as depicted by FIG. 5 are a plurality of stator-restrictor members. Those depicted by FIG. 5 are only a partial number of the total number of stator members located within chamber 14, with stator-restrictor member 40 being located at the center line of opening 18. The shape and size of the stator members as well as the rotor members to be described may vary as only certain configurations are shown. Stator member 40 is an unslotted generally rectangular shaped blade with arcuately shaped end portions 40a and 40b which are received by the recesses 31 and 32 in chamber 14. The respective end portions 40a and 40b are flanged, which flanged portion extends axially within the recesses 31 and 32. Stator member 40 has a central opening 50, as do all other stator members, which opening is larger than the largest cross sectional dimension of shaft 25 to permit unrestricted rotation of shaft 25. Mounted to either side of stator member 40 is a rotor member 60 having a polygonal central recess 60c which engages the central polygonal portion of shaft 25 for rotation therewith. Rotor member 60 has a pair of spaced arcuate end portions 60a and 60b. The respective side edges of rotor 60 may be hollow ground to provide for a shearing type of cut on the particles in cooperation with the adjacent stator members. All rotor members have polygonal recesses in the center thereof to slidably receive shaft 25. To simplify the explanation of the remaining stator or restrictor and rotor members only those to the left (as viewed in FIGS. 2 and 5) of central stator member 40 will be described with it being understood that a duplicate member exists to the right of central member 40 and in the same relationship as that described although the shape may vary. Mounted adjacent to rotor 60 is a rectangular shaped stator or restrictor member 41 having arcuately shaped flanged end portions 41a and 41b which nestle the arcuate end portions 60a and 60b of rotor 60. The flanged end portions act as spacers for the adjacent rotor. Mounted adjacent to stator member 41 is a rectangular shaped rotor member 61 having arcuately shaped end portions 61a and 61b which end portions are nestled in the flanged end portions 42a and 42b of the adjacent rectangular shaped stator member 42. The side edges 71 of the rotor member 61 as well as all the side edges of all other rotor members are hollow ground to facilitate the shearing action of the rotor in cooperation with the stator restrictor members. Stator member 42 is similar in construction to stator member 41. All of the stator restrictor members 40 through 42 described are unslotted, however, their rectangular shape presents stationary linear cutting edges 70 that cooperate with the hollow ground cutting edges 71 of the rotating or rotor members.

Mounted on shaft 25 for rotation therewith, adjacent to stator member 42 is a rectangular shaped rotor member 62 having arcuately shaped end portions 62a and 62b nestled by flanged end portions of adjacent rotor member 43 which rotor member 43 has a plurality of apertures 43a. Although the apertures are shown as vertical slots, these apertures may be triangular openings, oblong, diamond shaped, square or of any configuration which restrict the through flow of the particles. In this instance the apertures 43a and the linear cutting edges 43b cooperate with the adjacent hollow ground cutting edges 71 of rotor member 62 to shear the particle size passing through chamber 14 as it passes from opening 18 towards apertures 16 and compartment 15.

Mounted adjacent to stator restrictor member 43 is a multi-pronged rotor member 63 having a plurality of outwardly extending prongs or abutments 63a. Although six prongs 63a are shown, a greater number or less number may be employed. The shearing or cutting edges are hollow ground as at 71 similar to rotor members 60 and 61. Such shearing edges 71 cooperate with the vertically disposed apertures 44a in a circular shaped stator restrictor plate or member 44 adjacent to rotor member 63. A pair of opposite peripheral portions 44b are flanged to nestle the outwardly disposed end portions of the prongs 63a of rotor member 63. Mounted adjacent to stator restrictor plate or member 44 is a rotor member 64 shown as having a single radially extending prong or abutment 64a with hollow ground shearing edges. Although only one abutment is shown, any multi-pronged arrangement is contemplated. Mounted adjacent to rotor member 63 is a stator member 45 similar to stator restrictor member 44 having apertures 45a horizontally disposed or generally at 180° relative to the disposition of the apertures in stator member 44. Such aperture as stated previously may be triangular shaped member with their apexes disposed 180° relative to the apex of the prior aperture to provide assurance that the particle size will be reduced to a predetermined size. The range of aperture size may be from 0.01 to 5 square inches of opening with the non-linear arrangement being effective to provide the predetermined particle size. Mounted for rotation with shaft 25 and adjacent to stator member 45 is a multi-pronged rotor member 65, which member has hollow ground cutting edge 71. Mounted adjacent to rotor member 65 is circular shaped stator restrictor member 46 similar to stator member 44 having apertures therein. Mounted adjacent to stator member 46 on shaft 25 for rotation therewith is a rotor member 66, however, such member may be multi-pronged. As shown in FIG. 5 mounted adjacent to rotor member 66 is rectangular shaped stator member 47 having vertically disposed apertures 47a and arcuately shaped end portions 47b — 47b which are axially flanged to nestle the prong or prongs or laterally extending abutments of rotor member 66. Mounted adjacent to stator member 47 is an unslotted stator member 48 similar to centrally disposed stator member 40. It is to be noted that the composite rotor and stator members are axially spaced by the flanged portions of the stator restrictor edge portions thereof, but that the clearance space is such as to provide a floating type of action without interference between adjacent members of the stator and rotor members.

In the operation of the apparatus described, a slurry from a PVC reactor tank having some build-up in the form of lumps dispersed therethrough is fed through the opening 18 into the chamber 14. With motor 30 energized, the output therefrom rotates drive shaft 25 and the rotor members mounted thereon. As seen from FIG. 5, the rectangular shaped stator and rotor members adjacent to the opening 18 provide for the first stage of the lump breaking which is the rough breaking of any particles in the slurry that are oversized. The breaking action is a shearing type of cutting action from the linear cutting edges of the rotor members in cooperation with the stator members. As the slurry divides and moves towards the respective openings 16 in the end portion of chamber 14, the oversized particles in the slurry is sheared into the predetermined size by the respective downstream rotors 63-64-65 and 66 in cooperation with their adjacent restrictor members. This respective second and third stage lump breaking is not a pulverizing action, but an action to reduce the particle size to an acceptable range of sizes by providing an opening having a range of sizes as stated above which are disposed in overlapping pattern to assure the particle size desired. The spacer flanges on the outer peripheral edges of the stator members keeps the rotors in axial adjustment yet permit the axial clearance for sufficient play to assure the free rotation of the rotor members. As the slurry is fed through the apertures 16 to the compartment 15, the pressurized slurry is discharged via discharge opening 20.

Various modifications are contemplated and may obviously be resorted to by those skilled in the art without departing from the described invention, as hereinafter defined by the appended claims, as only a preferred embodiment thereof has been disclosed.

I claim:

1. A lump breaking apparatus for use on a slurry from a reactor tank; said apparatus having a housing; said housing having an upper portion and a lower portion; said upper portion having end portions and a centrally disposed inlet opening communicating with a chamber in the interior of said upper portion; said lower portion having a compartment with a discharge opening for the discharging of slurry therefrom; apertures at the respective said end portions communicating said chamber with said compartment of said lower portion; bearing means mounted in the respective end portions; a drive shaft extending centrally through said upper portion and journaled respectively in said bearing means; drive means connected to said shaft for rotating said shaft; a plurality of axially spaced stator members mounted in said upper portion; means interconnecting said stator members with said housing of said upper portion to prevent said stator members from rotating; a plurality of axially spaced rotor members mounted on said drive shaft for rotation therewith; each of said rotor members being located between a pair of stator members to provide an alternating array of said stator and said rotor members; and said stator members cooperative with said rotor members to reduce the particle size to a predetermined size.

2. A lump breaking apparatus as set forth in claim 1, wherein certain ones of said stator members have apertures therethrough for the passage of slurry therethrough and the remaining ones of said stator members having linear cutting edges cooperative with adjacent ones of said rotor members to shear the particles and reduce them to a predetermined size.

3. A lump breaking apparatus as set forth in claim 2, wherein said rotor members have at least one radially extending prong with a linear cutting edge.

4. A lump breaking apparatus as set forth in claim 3, wherein said apertures on said stator members have a range of aperture sizes from 0.01 to 5 square inches.

5. A lump breaking apparatus as set forth in claim 2, wherein said rotor members have multi-prong radially extending blades with linear cutting edges thereon.

6. A lump breaking apparatus as set forth in claim 2, wherein said stator members have spacer means on their respective outer edges to align said stator members and said rotor members in axially aligned relationship.

7. A lump breaking apparatus as set forth in claim 2, wherein the total square area of said discharge opening is greater than the total square area of said inlet opening.

8. A lump breaking apparatus as set forth in claim 1, wherein said means interconnecting said stator members to said housing permits axial sliding movement therein; said rotor members secured to said drive shaft are axially movable thereon; and said rotor members and said stator members retained in spaced relationship in said chamber on said shaft by spacer means on the end portions of said stator members.

9. A lump breaking apparatus as set forth in claim 1, wherein each of said stator members has a peripheral axially extending flanged portion within which an adjacent one of said rotor member is nestled and for spacing said stator and rotor members in said housing to an axially aligned set of said members with limited axial movement.

10. A lump breaking apparatus as set forth in claim 9, wherein certain ones of said rotor members adjacent to and nestled by said remaining stator members are rectangular shaped; and those of said rotor members adjacent to said certain ones of said stator members have multi-pronged abutments with linear shearing edges for cooperative shearing action with the apertures in said stator members.

11. A lump breaking apparatus as set forth in claim 10, wherein said apertures are elongated apertures, and said apertures of said certain ones of said stator members alternate in vertical and horizontal disposition in adjacent relationship.

12. A lump breaking apparatus for use on the slurry from a reactor tank, said apparatus having a housing; said housing having an upper portion and a lower portion; said upper portion being an elongated cylindrically shaped member with a pair of end portions and a centrally disposed chamber; an inlet opening in said cylindrical shaped portion communicating with said chamber; said lower portion having a compartment with an outlet opening for discharging the slurry therefrom, apertures at the respective said end portions communicating said chamber with said compartment; bearing means mounted in said end portions; a plurality of axially aligned stator members mounted in said chamber, each of said stator members having a central recess; a drive shaft extending centrally through said recesses and journaled in said bearing means; drive means connected to said shaft for rotating said shaft; a plurality of axially spaced rotor members axially slidably mounted on said drive shaft; means interconnecting said rotor member to said drive shaft for rotation therewith permitting axial movement thereon; said rotor members being located between a pair of stator members to provide an alternating arrangement of said stator and said rotor members.

13. A lump breaking apparatus as set forth in claim 12, wherein certain ones of said stator members have apertures therethrough; the remaining ones of said stator members being non-apertured and having linear side cutting edges cooperative with adjacent rotor members to shear lumps in such slurry; and said remaining ones of said stator members being located in that portion of said cylindrically shaped member that is adjacent to or directly below said inlet opening to said chamber.

14. A lump breaking apparatus as set forth in claim 13, wherein said upper portion has an elongated recess along its inner wall surface; each of said stator members has a peripheral axially extending flanged portion received by said recess to restrain said stator members from rotating; and said flanged portion provides axial spacing of said stator members.

15. A lump breaking apparatus as set forth in claim 14, wherein said rotor members are nestled by said flanged portion of adjacent ones of said stator members.

16. A lump breaking apparatus as set forth in claim 15, wherein said apertures have portions axially aligned and portions axially off-set to provide a non-linear path of movement of such slurry from said inlet opening to said outlet opening.

17. A lump breaking apparatus as set forth in claim 16, wherein said apertures have a cross-sectional area in a range from 0.01 to 5 square inches.

* * * * *